Figure 1:
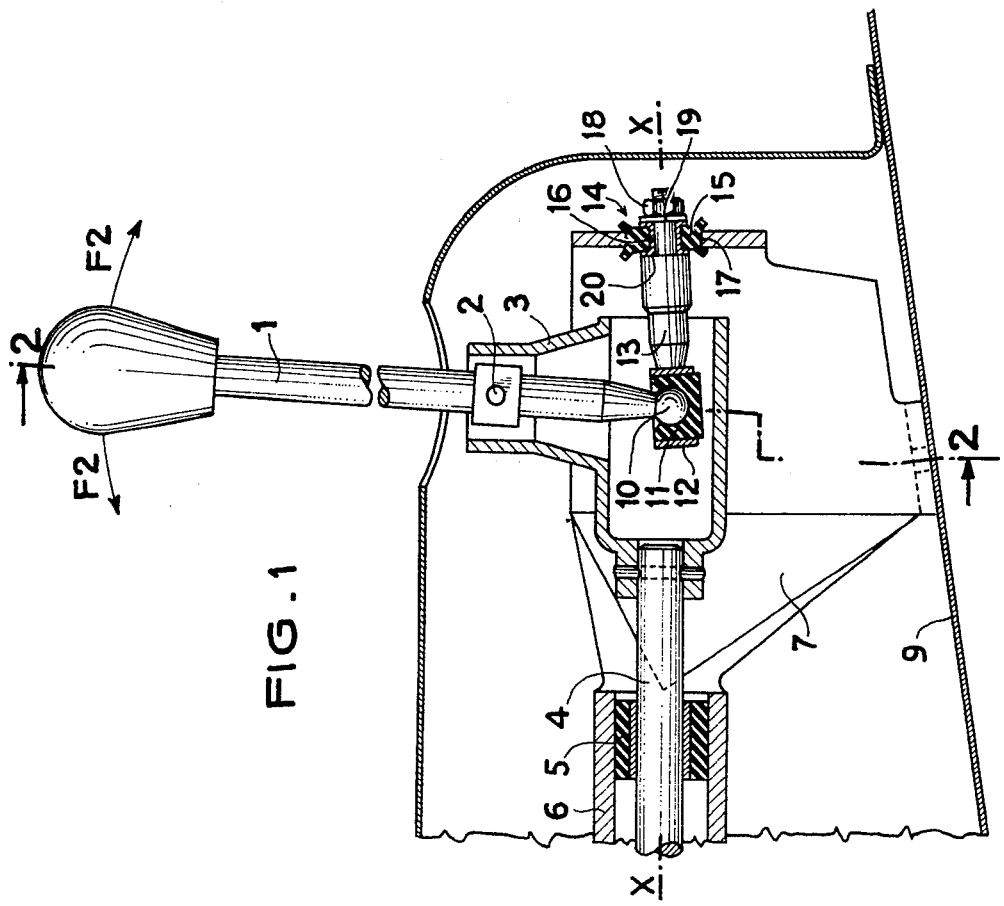

United States Patent [19]
Froumajou

[11] 3,899,934
[45] Aug. 19, 1975

[54] CONTROL DEVICE FOR A GEARBOX OF A VEHICLE

[75] Inventor: Armand Froumajou, Pontoise, France

[73] Assignees: Automobiles Peugeot, Paris; Regie Nahonale des Usines Renault, Boulogne-Billancourt, both of France

[22] Filed: Feb. 4, 1974

[21] Appl. No.: 439,283

[30] Foreign Application Priority Data
Feb. 8, 1973 France .............................. 73.04455

[52] U.S. Cl. .................. 74/471 XY; 74/473; 74/491
[51] Int. Cl.² .......................................... G05G 9/02
[58] Field of Search ........... 74/471 XY, 473 R, 491; 137/636.2; 200/6 A

[56] References Cited
UNITED STATES PATENTS
1,882,953  10/1932  Saelzler ........................... 137/636.2
3,211,180  10/1965  Fraser .......................... 137/636.2 X Primary Examiner—Allan D. Herrmann
Attorney, Agent, or Firm—Burns, Doane, Swecker & Mathis

[57] ABSTRACT

The control device comprises a floor-mounted change gear lever which is connected by a shaft to the speed-selecting and engaging mechanism. The lever is connected to a cage integral with the shaft to pivot about an axis substantially perpendicular to the axis of the shaft which is rotatable and axially slidable in bearings fixed relative to the floor. The lever is connected to the floor of the vehicle by a ball joint mounted at the end of an arm which is connected to the floor by an elastically yieldable connection.

6 Claims, 2 Drawing Figures

FIG.1

PATENTED AUG 19 1975　　3,899,934

CONTROL DEVICE FOR A GEARBOX OF A VEHICLE

The invention relates to a manual control device for an automobile vehicle gearbox of the type comprising at least one gear change lever actuated manually and a control shaft connected to speed selecting and engaging means of a mechanical gearbox of an automobile vehicle.

It is known that a speed is engaged by shifting the gear change lever successively in two perpendicular directions so as to achieve both the connection and then the engagement of the selected gear. These movements of the gear change lever produce two successive movements of the control shaft, namely a movement of translation and then of rotation or a movement of rotation followed by a translation. With present arrangements of the speed grids, when the gear change lever extends from the floor of the vehicle (floor-mounted lever) it is the rotation of the control shaft which ensures the selection and its translation which ensures the engagement of the gear. A reverse arrangement is adopted when the gear change lever is placed under the steering wheel of the vehicle (wheel-mounted lever).

In known devices for changing gears having a floor-mounted gear change lever this lever is mounted by means of a ball joint on a fixed support and connected to the control shaft through a pivot transverse to the shaft. Such an arrangement is described in French Pat. No. 1,569,612. In this case, the rotation of the shaft, achieved by a transverse displacement of the gear change lever, is accompanied by a transverse displacement of the shaft in the region of its pivotal connection to the lever. These mechanisms are not precise and do not permit the construction of independent subassemblies which facilitate the mounting on the vehicle.

In order to avoid these drawbacks, it is advantageous to support the control shaft by fixed bearings. In this way it is possible to achieve rotation and translation of the control shaft by employing a lever which is pivotably mounted in a cage integral with the control shaft and has a ball cooperating with a fixed block. Such arrangements are currently employed for gear change controls having a lever placed under the steering wheel on the steering column.

On the other hand, this arrangement has serious drawbacks when it is desired to apply it to gear change controls having a floor-mounted lever. Indeed, in this case, the movement of translation of the control shaft is accompanied by a sliding of the ball of the lever with respect to the block in which it is guided. Now, as already explained, in the case of a floor-mounted lever this movement of translation corresponds to the engagement of the gear in respect of which the force to transmit is relatively great. Since the surface of contact between the ball and the block is very small, rapid wear occurs with resulting play between the two members.

An object of the present invention is to overcome this drawback.

The invention provides a control device for a vehicle gearbox of the type comprising a manually actuated lever which extends from the floor of the vehicle, a control shaft mounted to rotate and slide about and along a fixed axis, a cage which is integral with the shaft and to which cage the lever is pivotably connected, the lever being connected to a fixed support through a ball joint, the lever carrying the male part of this ball joint the centre of which is substantially on said fixed axis, wherein the female part of the ball joint is a bushing in which the male part or ball is maintained without clearance, said bushing being carried by a member pivoted to the fixed support.

According to a preferred embodiment, the bushing is carried by an arm which is substantially co-axial with the control shaft. Moreover, the arm carrying the bushing is preferably connected to the fixed support by a resiliently-yieldable pivotable connection.

Further features and advantages of the invention will be apparent from the ensuing description with reference to the accompanying drawing.

Figure 2:
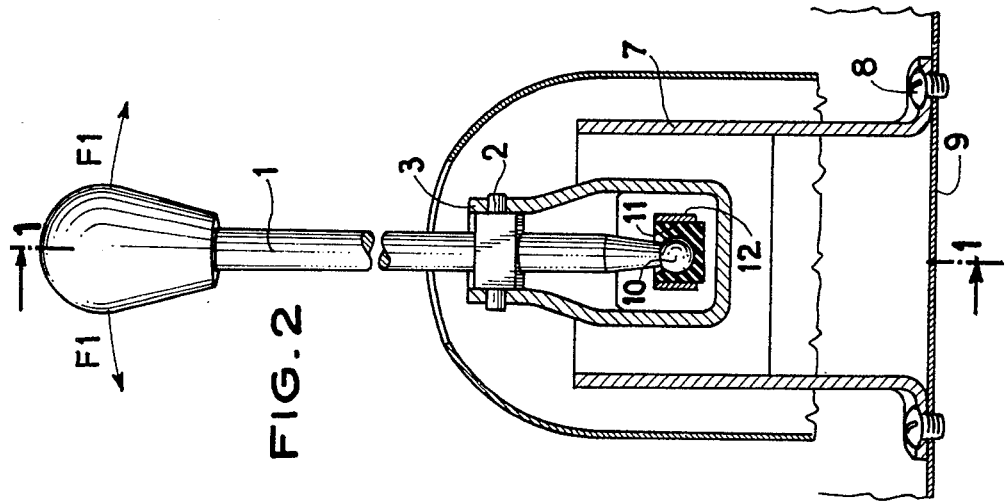

In the drawing:

FIGS. 1 and 2 are respectively longitudinal and cross sectional views of the improved control device according to the invention.

As shown in the drawing, a gear change lever 1 is mounted to pivot about a transverse pivot pin 2 on a cage 3 integral with a control shaft 4. The latter is connected at its other end in the known manner to speed selecting and engaging means (not shown). In this description, the term longitudinal designates a direction parallel to the longitudinal axis of the vehicle and transverse a direction perpendicular to this axis.

The shaft 4 is maintained on a fixed axis X-X by bearings such as 5 carried by a tube 6 integral with a support 7. The latter is fixed by means of screws 8 to the floor 9 of the vehicle.

The lower end of the lever 1 defines or carries a spherical ball or male end 10 whose centre is substantially on the axis X—X. This ball is mounted in a bushing 11 which is of self-lubricating material and a drive-fit in a collar formed at one end of an arm 13 whose other end is connected by resiliently-yieldable pivotable means 14 to the fixed support 7.

The resiliently-yieldable pivot means 14 comprises a sleeve 15 of rubber or other elastomer carried, for example, by a ring 16 and fitted in an aperture 17 formed in the support 7. The ring 16 is clamped by a nut 18 between a washer 19 and a shoulder 20 on the arm 13.

The assembly just described operates in the following manner:

To select a gear the upper end of the gear change lever 1 is shifted in one direction or the other in the transverse direction F1. As the shaft 4 is maintained in its bearing 5 the assembly, comprising the shaft 4, the cage 3 and the lever 1, rotates about the axis X—X. Thus, the shaft 4 is simply rotated and this drives in the known manner the pre-selecting means.

To engage thereafter the selected gear the lever 1 is shifted in the direction F2. As the axis of the shaft 4 is still fixed, the lever undergoes a new rotation about the centre of the ball 10 which moves then slightly with respect to the axis X—X of the shaft 4. This movement is made possible by the presence of the resiliently-yieldable connection 14 which allows the arm 13 to undergo slight angular movements. Simultaneously, the transverse pin 2 moves in the direction F2 and drives the cage 3 and the control shaft 4 in axial translation so that the selected gear is engaged in the known manner.

It can be seen that this arrangement permits supporting the forces for engaging the speeds on a large area of the ball 10 which is maintained well in its bushing 12 and no longer has a point, or at best a linear surface contact, with this bushing as in known arrangements. Moreover, the reaction force is transmitted substantially axially by the arm 13 to the fixed support 7 under excellent conditions, in particular owing to the presence of the resiliently-yieldable connection 14.

Having now described my invention what I claim as new and desire to secure by Letters Patent is:

1. A control device for a gearbox for a vehicle comprising means defining a support for securing to the floor of the vehicle, a control shaft rotatable and slidable about and along a fixed axis relative to the support, a cage integral with or attached to the control shaft, a manually-shiftable gear lever pivoted to the cage, a ball joint substantially centered on said axis and having a male part and a female part, and a member connected to the support to be capable of a limited pivoting movement relative to the support and carrying the female part of the ball joint, the lever carrying the male part of the ball joint, the female part of the ball joint being a bushing in which the male part is engaged without clearance.

2. A device as claimed in claim 1, wherein the member is connected to the support by a resiliently-yieldable connection.

3. A device as claimed in claim 1, wherein said member is an arm which is substantially coaxial with the control shaft.

4. A device as claimed in claim 3 wherein the connection between the member and the support comprises means defining an aperture in the support and substantially coaxial with the control shaft, and a sleeve of elastomer received in the aperture, and through which said member extends.

5. A device as claimed in claim 3, wherein the arm carries a collar and the bushing is of a self-lubricating material and an interference fit in the collar.

6. A device as claimed in claim 1, wherein the lever is pivotable relative to the cage about an axis substantially orthogonal to said fixed axis.

* * * * *